3 Sheets--Sheet 2.

P. J. HARDY.
Heating-Stove.

No. 163,988.  Patented June 1, 1875.

WITNESSES:
Jas. C. Hutchinson
John R. Young

INVENTOR.
P. J. Hardy, by
Prindle and Co, his Att'ys

THE GRAPHIC CO.PHOTO-LITH.39 & 41 PARK PLACE, N.Y.

P. J. HARDY.
Heating-Stove.

No. 163,988.

3 Sheets--Sheet 3.

Patented June 1, 1875.

WITNESSES:
Jas. E. Hutchinson
John R. Young

INVENTOR.
P. J. Hardy, by
Prindle and Co., his Attys

UNITED STATES PATENT OFFICE.

PIERRE J. HARDY, OF NEW YORK, N. Y.

IMPROVEMENT IN HEATING-STOVES.

Specification forming part of Letters Patent No. 163,988, dated June 1, 1875; application filed March 27, 1875.

*To all whom it may concern:*

Be it known that I, PIERRE J. HARDY, of New York city, in the county of New York and in the State of New York, have invented certain new and useful Improvements in Heating-Stoves; and do hereby declare that the following is a full, clear, and exact description thereof, reference being had to the accompanying drawings making a part of this specification, in which—

Figure 1:
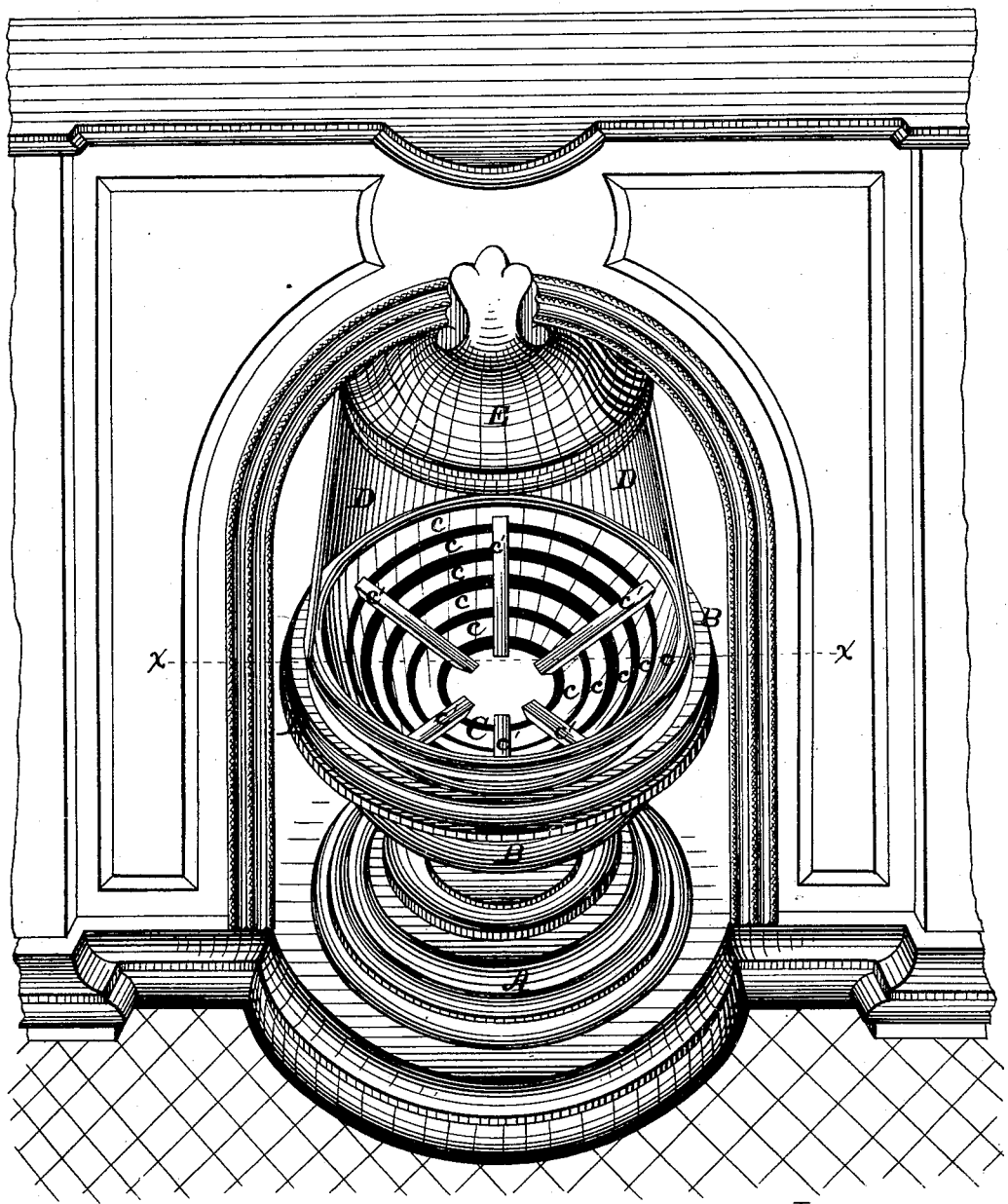
Figure 2:
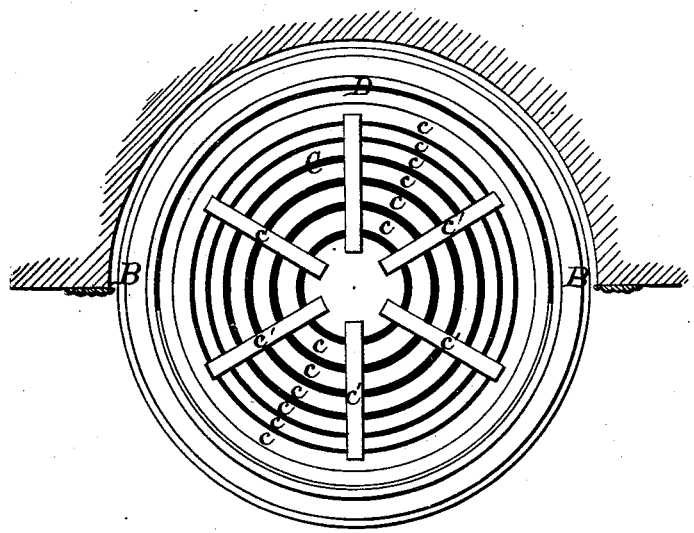
Figure 3:
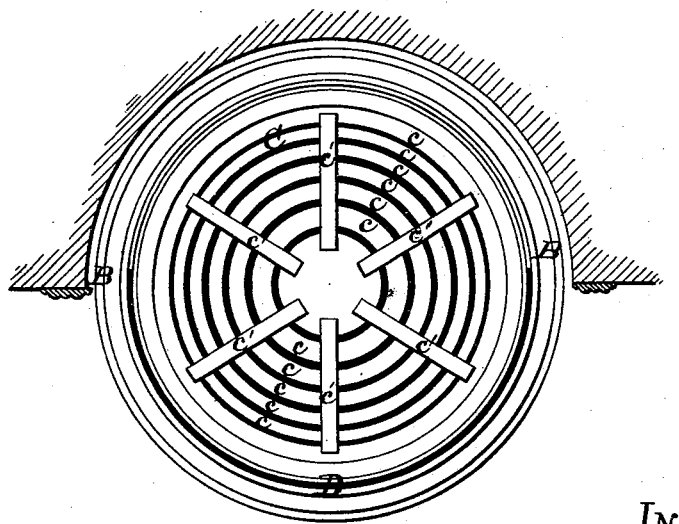
Figure 4:
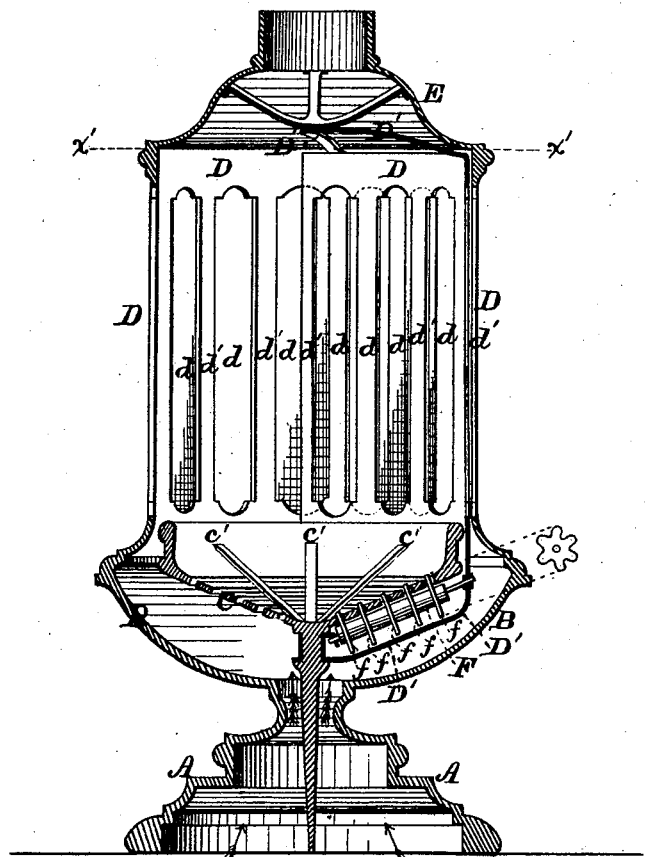
Figure 5:
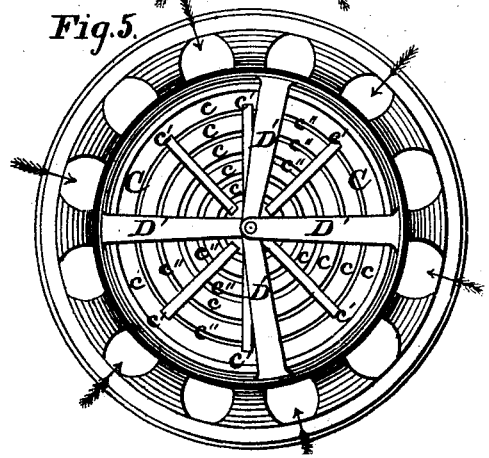

Figure 1 is a perspective view of my improved heater arranged within a fire-place. Figs. 2 and 3 are horizontal sections of the same upon line $x\,x$ of Fig. 1, showing the arrangement of parts when the casing is open and closed. Fig. 4 is a vertical central section of the same as constructed for use within a room in place of an ordinary stove, and Fig. 5 is a horizontal section upon line $x'\,x'$ of Fig. 4.

Letters of like name and kind refer to like parts in each of the figures.

The design of my invention is to enable a heating-stove to be converted at will into an open or an inclosed form; and, further, to enable the grate to be readily freed from cinders; to which end it consists, principally, in a stove, having the circular portion of its casing above its grate made sectional, pivoted centrally at its upper and lower ends, and arranged to rotate around its axial center, so as to enable the interior of said stove to be exposed or inclosed at will, substantially as and for the purpose hereinafter specified. It consists, further, in the means employed for removing cinders, clinkers, &c., from within the openings of the grate, substantially as is hereinafter shown.

In the annexed drawings, A represents the base, and B the fire-pot, of a stove, which has a circular form horizontally, and is provided with a correspondingly-shaped grate, C, that is preferably made concave upon its upper side, and extends to or near the upper edge of said fire-pot. Above the fire-pot B is placed a casing, D, which is formed horizontally upon a circular line, has its upper and lower edges contained within the edges of said fire-pot and the top plate E, and extends around but little more than one-half the circumference of the space or combustion-chamber between said fire-pot and top plate. The casing D is loosely confined in place, and supported by means of two or more bars, D', which are secured to its upper and lower ends, and extending inward, as seen in Fig. 4, are pivoted upon some suitable support at the center of the stove. This arrangement enables the casing D to be easily and quickly rotated upon and around its axial center, so as to unclose or uncover either side of the stove, as may be desired, while from the manner of connecting said casing with said stove, neither vertical nor radial expansion of parts will interfere with its freedom of motion.

As constructed the stove is intended for use within a fire-place, and is arranged so as to cause one-half or more of its bulk to project beyond the face of the mantle, its exit-flue being carried from the upper central portion of the top plate E into the chimney, in which position, by turning the casing D rearward, the interior of the stove will be exposed, and present the appearance of an open grate, while, by turning said casing to the front, said stove will resemble a fire-place heater, its fire-chamber being inclosed.

The casing may be close, as shown in Fig. 1; or it may be provided with mica windows, as desired, in which latter case the resemblance to a fire-place heater of ordinary construction would be complete.

For use within a room, the casing D is preferably double, its outer portion being stationary, while its inner portion is capable of rotation. Said casings extend around the entire combustion-chamber, and are provided with openings $d$ and $d$, that are separated by bars or solid portions $d'$ and $d'$, which have somewhat greater breadth than said openings, so that, when said inner casing is turned until its bars $d'\,d'$, &c., are opposite to the openings $d\,d$, &c., of said outer casing, the solid portions of each shall overlap and entirely close the combustion-chamber.

When thus constructed nearly one-half of the casing can be made open at will, or can be closed, so as to exclude the light from the burning fuel. By providing each alternate opening $d$ within both inner and outer casing with mica, said casings can be arranged so that the glazed and unglazed openings will alternate, or each opening will be glazed.

The grate C is constructed of a series of concentric rings, c c, &c., which are combined by means of a number of radial bars, c' c', &c., secured to or upon their upper surfaces, and have between their contiguous edges annular openings c'' c'', &c.

In order that the openings c'' may be freed from slate and clinker, when desired, a shaft, F, is journaled radially beneath one side of the grate C, and is provided with a number of toothed wheels or disks, f f, &c., one of which fits within, and projects just to the upper side of, each opening c''. The grate C is now arranged to rotate freely around its axis, when its motion will be communicated to the disks f f, and the latter caused to free the openings c'' and c'' from obstruction.

If desired, the shaft F may also be arranged to revolve, in which event its toothed disks would grind and remove any refuse matter they might meet with.

The arrangements for the admission of air to the burning fuel, and for the removal of ashes, being no part of my invention, description of the same would be unnecessary.

If desired, the upper and lower portions of my stove may be connected together by means of a standard, which can pass vertically through the center of the fire-pot and combustion-chamber.

Having thus fully set forth the nature and merits of my invention, what I claim as new is—

1. A heating-stove having the circular portion of its casing above its grate made sectional, centrally pivoted at its upper and lower ends, and capable of rotation around its axial center, substantially as and for the purpose specified.

2. In combination with the annular openings c'' c'', &c., of the horizontally-rotating grate C, the shaft F, provided with the toothed disks f f, &c., and arranged to cause one of said disks to be contained within each of said annular openings, substantially as and for the purpose shown.

In testimony that I claim the foregoing I have hereunto set my hand this 20th day of March, 1875.

PIERRE J. HARDY.

Witnesses:
 GEO. S. PRINDLE,
 E. F. M. FAEHTZ.